United States Patent
Hunsaker et al.

(10) Patent No.: US 8,041,844 B2
(45) Date of Patent: Oct. 18, 2011

(54) AUTODETECTION OF A PCI EXPRESS DEVICE OPERATING AT A WIRELESS RF MITIGATION FREQUENCY

(75) Inventors: Mikal C. Hunsaker, El Dorado Hills, CA (US); Karthi Vadivelu, Folsom, CA (US); Andrew W. Martwick, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 326 days.

(21) Appl. No.: 11/026,968

(22) Filed: Dec. 29, 2004

(65) Prior Publication Data

US 2006/0143338 A1 Jun. 29, 2006

(51) Int. Cl.
| | |
|---|---|
| G06F 3/00 | (2006.01) |
| G06F 13/00 | (2006.01) |
| G06F 5/00 | (2006.01) |
| G06F 1/24 | (2006.01) |
| H04B 3/36 | (2006.01) |
| H04B 7/14 | (2006.01) |
| H04B 1/18 | (2006.01) |
| H04B 1/38 | (2006.01) |
| H04B 3/20 | (2006.01) |
| H04M 1/00 | (2006.01) |
| H04M 11/00 | (2006.01) |
| H03H 7/30 | (2006.01) |

(52) U.S. Cl. .......... 710/8; 710/33; 710/60; 710/61; 713/100; 370/292; 375/231; 379/93.08; 455/7; 455/15; 455/193.3; 455/557

(58) Field of Classification Search .......... None
See application file for complete search history.

(56) References Cited

U.S. PATENT DOCUMENTS

| | | | | |
|---|---|---|---|---|
| 4,409,687 | A * | 10/1983 | Berti et al. | 455/7 |
| 5,483,676 | A * | 1/1996 | Mahany et al. | 455/67.14 |
| 5,490,209 | A * | 2/1996 | Kennedy et al. | 379/93.08 |
| 5,729,557 | A * | 3/1998 | Gardner et al. | 714/774 |
| 5,764,111 | A * | 6/1998 | Bushman | 331/57 |
| 5,808,760 | A * | 9/1998 | Gfeller | 398/27 |
| 5,914,959 | A * | 6/1999 | Marchetto et al. | 370/468 |
| 6,081,700 | A * | 6/2000 | Salvi et al. | 455/193.3 |
| 6,295,563 | B1 * | 9/2001 | Whittaker | 710/52 |
| 6,438,159 | B1 * | 8/2002 | Uber et al. | 375/225 |
| 6,442,628 | B1 * | 8/2002 | Bastiani et al. | 710/60 |

(Continued)

FOREIGN PATENT DOCUMENTS

DE 10113196 A1 11/2001

(Continued)

OTHER PUBLICATIONS

"PCI Express Base Specification," Revision 1.0a (Apr. 15, 2003), pp. 27-40.*

(Continued)

*Primary Examiner* — Tariq Hafiz
*Assistant Examiner* — Henry Yu
(74) *Attorney, Agent, or Firm* — David P. McAbee

(57) ABSTRACT

A computer system that detects for a PCI Express compliant endpoint device is described. Specifically, the computer system clocks transmit and receive circuits at a first frequency and initiates a training sequence. If the endpoint device successfully trains at the first frequency, the endpoint device is PCI Express compliant. Otherwise, the computer system initiates another training sequence at a second frequency.

18 Claims, 3 Drawing Sheets

U.S. PATENT DOCUMENTS

| | | | |
|---|---|---|---|
| 6,565,509 B1* | 5/2003 | Say et al. | 600/365 |
| 6,690,949 B1* | 2/2004 | Shamlou et al. | 455/557 |
| 6,798,869 B1 | 9/2004 | Sidhu et al. | |
| 6,901,265 B2* | 5/2005 | Pratt | 455/456.6 |
| 7,076,033 B2* | 7/2006 | Sidhu et al. | 379/93.08 |
| 7,099,965 B2* | 8/2006 | Ellerbrock et al. | 710/61 |
| 7,227,891 B2* | 6/2007 | Wang | 375/231 |
| 7,346,012 B2* | 3/2008 | Stopler | 370/286 |
| 7,580,696 B2* | 8/2009 | Ghabra et al. | 455/352 |
| 2005/0138348 A1* | 6/2005 | Bolay et al. | 713/100 |
| 2006/0050707 A1* | 3/2006 | Sterin | 370/394 |
| 2006/0090014 A1 | 4/2006 | Wong et al. | |

FOREIGN PATENT DOCUMENTS

| | | |
|---|---|---|
| WO | 2006/071665 A2 | 7/2006 |
| WO | 2006/071665 A3 | 9/2006 |

OTHER PUBLICATIONS

Int'l Search Report PCT/US2005/046312, mailed Jul. 27, 2006, 3 pages.

PCI-SIG: "PCI Express Base Specification Rev. 1.0," Apr. 29, 2002, PCI-SIG, XP002389090 p. 27-42 and p. 157-180.

PCI-Sig: "Errata for the PCI Express Base Specification Rev. 1.0," Jul. 14, 2004, PCI SIG, XP002389091, whole document.

Office Action received for Taiwanese Patent Application No. 94146175, mailed on Aug. 22, 2008, 2 pages of English Translation and 1 page of Taiwanese Search Report.

International Preliminary Report on Patentability received for PCT Patent Application No. PCT/US2005/046312, mailed on Jul. 12, 2007, 9 pages.

Office Action received for German Patent Application No. 1120050032868, mailed on May 31, 2010, 6 pages of German Office Action including 3 pages of English Translation.

Office Action received for German Patent Application No. 112005003286.8, mailed on Sep. 9, 2009, 9 pages of German Office Action including 4 pages of English Translation.

Office Action received for Chinese Patent Application No. 200580045097.7, mailed on Mar. 27, 2009, 15 pages of Chinese Office Action including 9 pages of English Translation.

PCI Express Architecture Endpoint Compliance Checklist for the PCI Express Base 1.0a Specification, retrieved Mar. 23, 2011.

* cited by examiner

AUTODETECTION OF A PCI EXPRESS DEVICE OPERATING AT A WIRELESS RF MITIGATION FREQUENCY

FIELD

The present invention pertains to the field of computer system design. More particularly, the present invention relates to a root port that detects whether an attached device is operating at a PCI Express frequency or an alternative wireless extension frequency.

BACKGROUND

Peripheral Component Interconnect (PCI) is a computer bus design standard for connecting peripheral components to computers. A PCI bus typically routes signals between a central processing unit (CPU), various other chips on the motherboard, and cards that are plugged into PCI bus slot connectors. The PCI bus, however, is independent of the CPU chip implemented in a computer system. Thus, the PCI bus is adapted for use in many different kinds of computers or other high-tech hardware. Earlier versions of the PCI standard included PCI 2.2 and PCI-X.

PCI Express is the third generation of PCI architecture. PCI Express offers higher input/output (I/O) bandwidth than its predecessors. Traditional PCI attributes, such as its usage model and software interfaces, are maintained. However, the previous parallel bus implementation has been replaced by a link-to-link serial interface. Further, a split-transaction protocol is implemented with attributed packets that are prioritized and optimally delivered to their target.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

The PCI Express architecture is typically composed of a plurality of layers. For example, a software layer generates PCI Express read and write requests. A transaction layer, coupled to the software layer, transports the software-generated requests to I/O devices using a packet-based, split-transaction protocol. A link layer coupled to the transaction layer adds sequence numbers and a cyclical redundancy check (CRC) number to the packets to create a highly reliable data transfer mechanism. Finally, a physical layer coupled to the link layer transports the packets to another PCI Express device.

The PCI Express 1.0a specification supports a frequency of 2.5 gigahertz (GHz). This frequency may be referred to as the Gen1 frequency. The Gen1 frequency is similar to the wireless 2.4 GHz spectrum. As a result, the Gen1 frequency potentially causes radio frequency (RF) interference with wireless communications.

To reduce the RF interference of a wireless endpoint, a mechanism in a PCI Express port may reduce the data transfer rate. As an example, the data transfer rate is reduced to 833 megahertz (MHz), or one-third the Gen1 frequency. A mechanism to reduce the data transfer rate is described in more detail in co-pending application with Ser. No. 10/629,967 entitled, "RF Interference Mitigation by Spectral Shaping Using Adaptive Data Rate Adjustment for PCI Express Interconnect." The 833 MHz transfer rate is also known as the wireless extension frequency.

By definition of the PCI Express 1.0a specification, a computer system that communicates only with a device that operates at the wireless extension frequency is not PCI Express compliant. To maintain PCI Express compliance, a computer system that is able to communicate with non-PCI Express compliant devices also communicates with PCI Express compliant devices.

Figure 1:
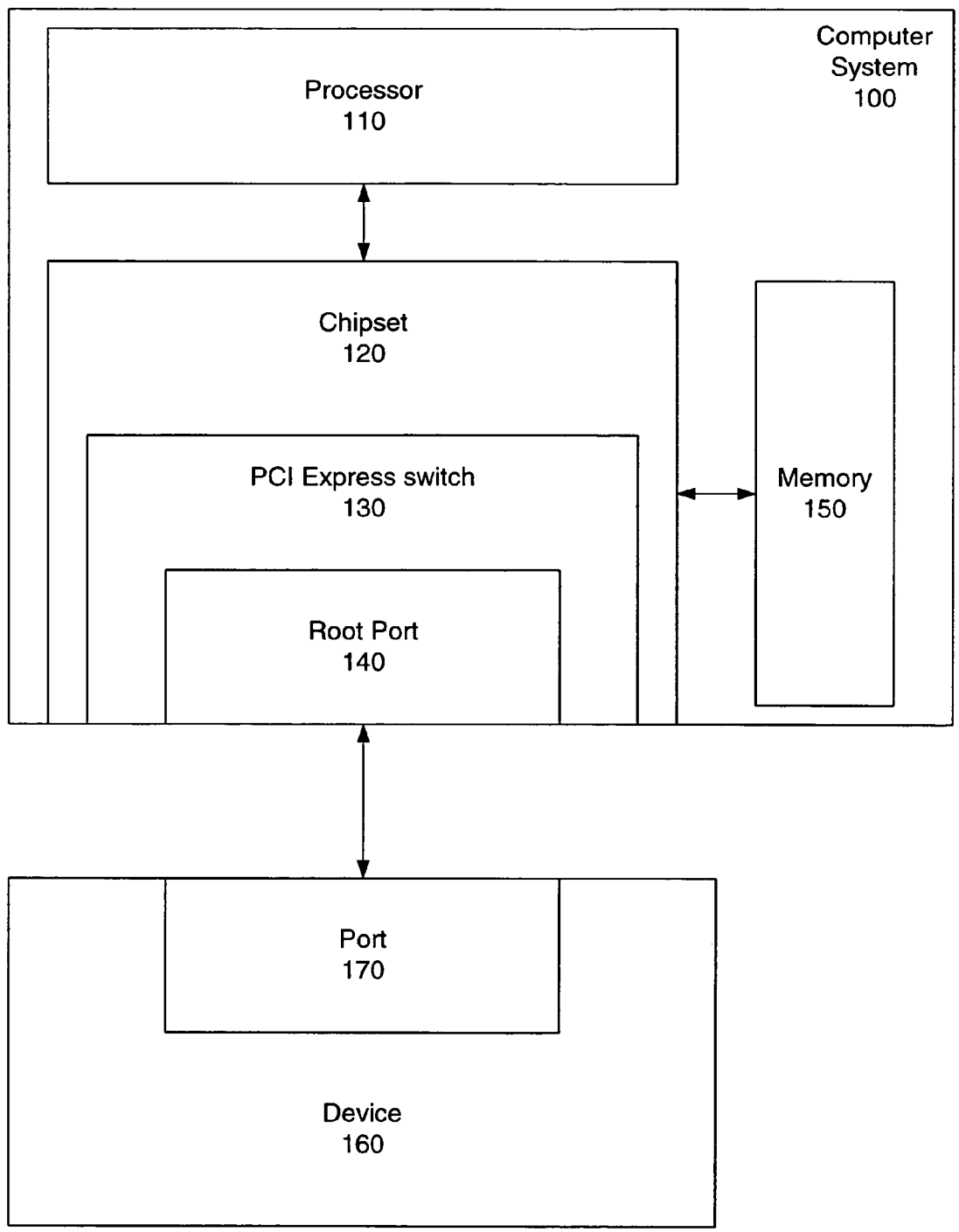
FIG. 1 is an embodiment of a computer system that supports both PCI Express compliant devices and non-PCI Express compliant devices.

FIG. 1 depicts a PCI Express compliant computer system that is able to communicate with both a device operating at the Gen1 frequency and a device operating at the wireless extension frequency. The computer system 100 of FIG. 1 comprises a processor 110, a chipset 120, and a memory 150. Computer system 100, which refers to processor 110, chipset 120, and memory 150, is coupled to device 160. However, a computer system may include device 160.

In one embodiment, device 160 is either a PCI Express compliant or non-PCI Express compliant device. Coupling of device 160 to chipset 120 may comprise physically coupling device 160 to chipset 120 or wirelessly coupling device 160 to chipset 120. As an example, chipset 120 has a transmitter to transmit data to and a receiver to receive data from coupled device 160. Device 160, as illustrated, further comprises port 170, which is discussed in more detail below.

Chipset 120 is coupled to processor 110, memory 150, and device 160. Chipset 120 is illustrated as a single block; however, chipset 120 is not so limited. In fact, often chipset 120 comprises a plurality of controller hubs or integrated circuits. As a specific example, chipset 120 comprises a memory controller hub (MCH) coupled to processor 110 and memory 150, as well as an interconnect controller hub (ICH), also referred to as an input/output hub (IOH), coupled to the MCH and I/O devices through a bus, such as PCI Express. Using typical memory bus protocols, chipset 120 delivers data between the processor 110 and memory 150.

Also shown in chipset 120 is PCI Express switch 130. In one embodiment, PCI Express switch 130 adjusts a frequency of the data transmitted by a transmitter present in chipset 120. Moreover, the PCI Express switch 130 may adjust the clock frequency of its receiver. For example, PCI Express switch 130 adjusts the receiver clock from the Gen1 frequency to the wireless extension frequency.

In one embodiment, root port 140, also illustrated in chipset 120, attempts to establish communication with a connected device at the Gen1 frequency. If the communication is unsuccessful after N attempts, root port 140 auto-detects for a connected device operating at a wireless extension frequency. The root port 140 and PCI Express switch 130 may be part of the physical layer or any other layer present in a PCI Express bus/protocol.

Figure 2:
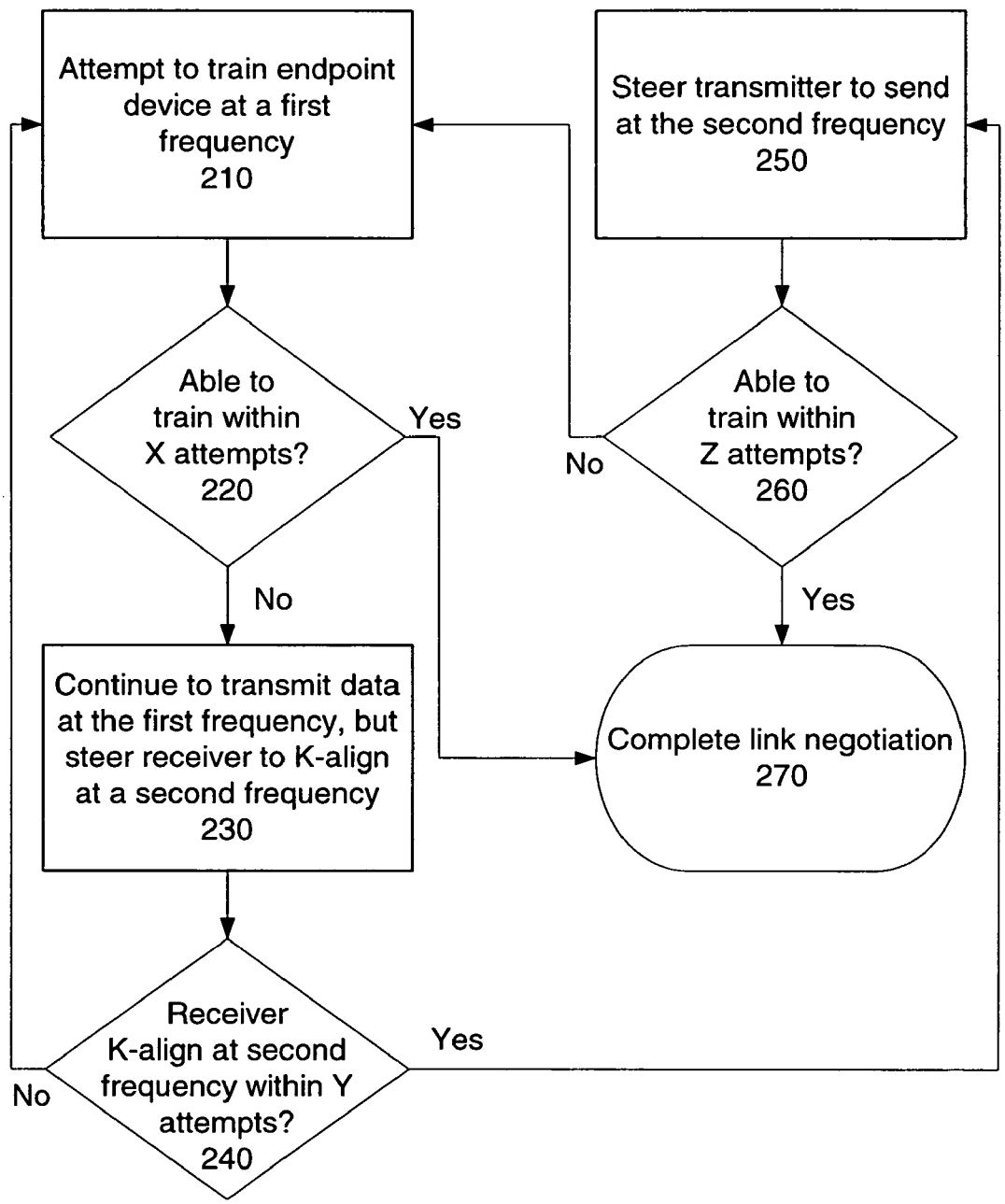
FIG. 2 is an embodiment of a flowchart to auto-detect a non-PCI Express compliant wireless extension device.

FIG. 2 depicts a flowchart of an algorithm for auto-detecting a connected device operating at a wireless extension frequency. In one embodiment, the algorithm is implemented by root port 140. As stated above root port 140 is illustrated in chipset 120; however, root port 140 is not so limited, as root port 140 may also be present in a separate controller hub, integrated circuit, switch, or bridge in the hierarchical connection of a peripheral bus.

In operation 210, root port 140 attempts to "train" a connected endpoint device at a first frequency. In a first embodiment, data is transmitted at a first frequency. As another example, in addition to transmitting data at the first frequency, the root port receiver is also clocked at the first frequency. As a specific example, the first frequency is the Gen1 frequency. Training may comprise a "bit-lock" and a "K-align lock" of the physical layers of each device. However training is not so limited. For example, training may also include exchanging training sequences between devices. Bit-lock refers to the ability of the receiver to properly lock onto specific bits within a bit-stream by identifying bit transition edges. K-align lock refers to the ability of the receiver to determine symbol boundaries within a bit pattern.

If root port 140 is able to train the endpoint device within X attempts in operation 220, the endpoint device is PCI Express compliant and the link negotiation is terminated in operation 270. The number of attempts, X, may be a software programmable value with a hardware default. Furthermore, X may be an integer greater than or equal to one.

However, if root port 140 is unable to train the endpoint device within X attempts, the receiver is clocked at a second frequency in operation 230. The receiver then attempts to K-align at the second frequency. As a specific example, root port 140 continues to transport/transmit data at the first frequency. The receiver may attempt to K-align at the second frequency for Y attempts in operation 240. The number of attempts, Y, may be a software programmable value with a hardware default, as well as an integer equal to or greater than one. Both the number of attempts X and Y may also be a predetermined number of attempts in hardware or in software, as well as any combination of hardware and software.

Yet, if the receiver fails to K-align at the second frequency in operation 240, the root port 140 returns to operation 210 and again attempts to train the endpoint device at the first frequency.

On the other hand, if the receiver successfully K-aligns at the second frequency, the transmitter is adjusted to transmit data at the second frequency in operation 250. Root port 140 next attempts to train the endpoint device within Z attempts at the second frequency in operation 260. Thus, the receiver attempts to bit-lock, i.e. properly lock, onto specific bits within a bit-stream, and to K-align lock to determine symbol boundaries within a bit pattern. As stated above for X and Y, Z may also be a predetermined or programmable integer implemented in hardware, software, or firmware.

Nevertheless, if the receiver fails to train the endpoint device at the second frequency within Z attempts in operation 260, the root port 140 returns to operation 210 and again attempts to train the endpoint device at the first frequency. Otherwise, if the receiver successfully trains at the second frequency within Z attempts, the link negotiation is terminated in operation 270.

Figure 3:
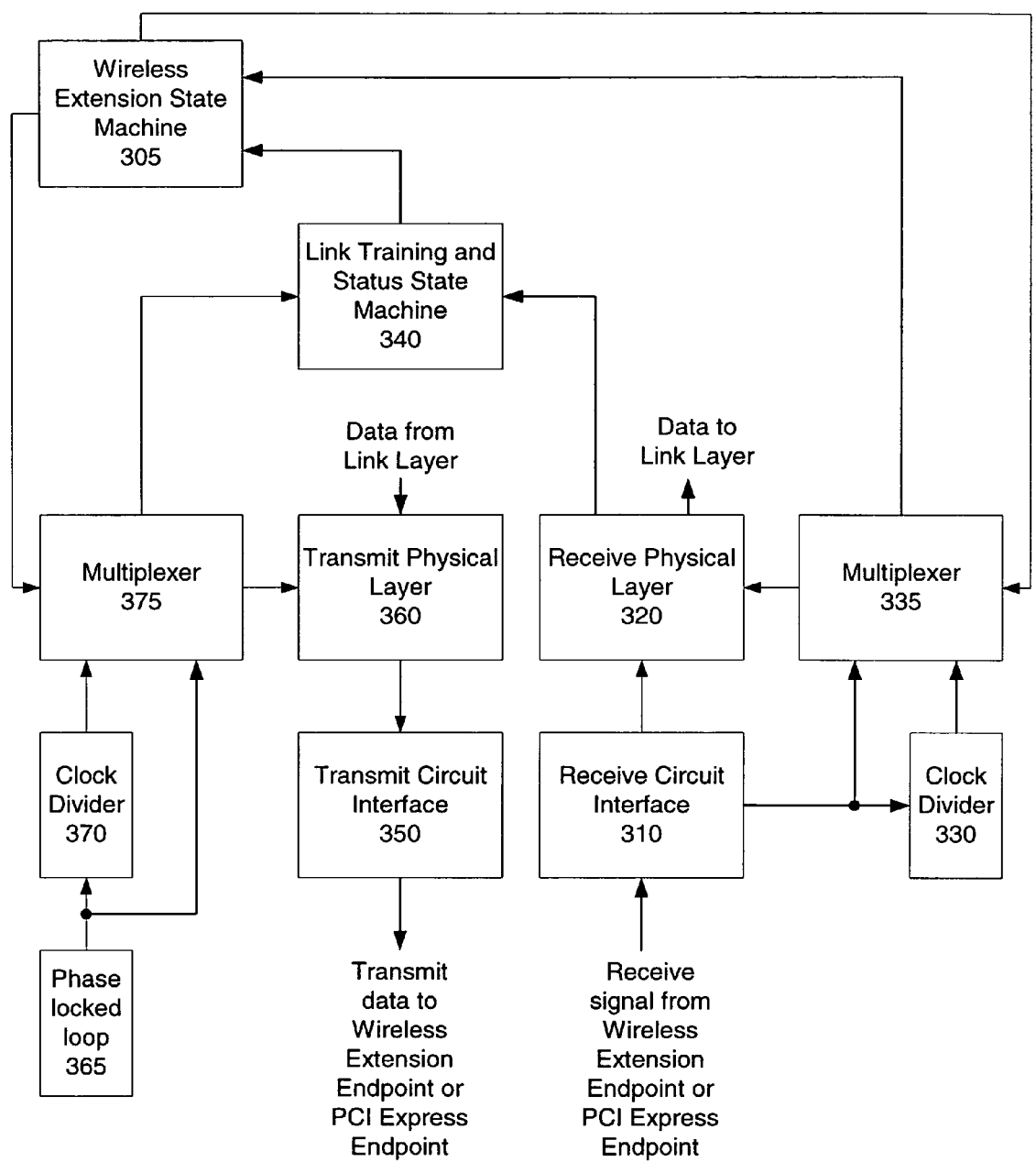
FIG. 3 is a block diagram of an embodiment of a device for detecting PCI Express compliant and non-PCI compliant devices.

FIG. 3 depicts a block diagram of an embodiment of a device for detecting PCI Express compliant and non-PCI compliant devices. FIG. 3 comprises a wireless extension state machine 305, a receive circuit interface 310, a receive physical layer 320, a clock divider 330, a multiplexer 335, a link training and status state machine 340, a transmit circuit interface 350, a transmit physical layer 360, a phase locked loop 365, a clock divider 370, and a multiplexer 375.

Receive circuit interface 310 is coupled to receive physical layer 320, clock divider 330, and multiplexer 335. Clock divider 330 is coupled to multiplexer 335. Receive physical layer 320 is coupled to link training and status state machine 340. Link training and status state machine 340 and multiplexer 335 are coupled to wireless extension state machine 305. Phase locked loop 365 is coupled to clock divider 370. Clock divider 370 is coupled to multiplexer 375. Multiplexer 375 is coupled to link training and status state machine 340.

In one embodiment, receive circuit interface 310 receives a signal from a wireless extension endpoint. In another embodiment, receive circuit interface 310 receives a signal from a PCI Express endpoint. Receive circuit interface 310 may comprise an I/O buffer. The signal input to receive circuit interface 310 may comprise a clock and a data signal. In one embodiment the clock signal is extracted from the data signal. Receive circuit interface 310 may extract the clock from the signal and transmit the clock to clock divider 330 and multiplexer 335. Receive circuit interface 310 transmits the data to receive physical layer 320 for processing. The data is subsequently passed from the receive physical layer 320 to link training and status state machine 340 and to the link layer.

The clock extracted from the signal received by the endpoint device may have a Gen1 frequency. As a specific example, clock divider 330 divides the clock by three. Thus, the inputs to the multiplexer 335 may be a Gen1 frequency and a wireless extension frequency. The wireless extension state machine 305 transfers a signal to the multiplexer 335 to select whether the Gen1 frequency or the wireless extension frequency is output from the multiplexer 335. For one embodiment, the wireless extension state machine 305 selects the Gen1 frequency, if the wireless extension state machine 305 determines that a PCI Express device is coupled to the receive circuit interface 310 and the transmit circuit interface 350. However, the wireless extension frequency may be selected by the wireless extension state machine 305, if the wireless extension state machine 305 determines that a wireless extension device is coupled to the receive circuit interface 310 and the transmit circuit interface 350.

Besides selecting the receiver clock, in one embodiment, the wireless extension state machine 305 also selects the transmitter clock. It is apparent that another state machine may select the transmitter clock. Wireless extension state machine 305 provides a select signal to multiplexer 375. Multiplexer 375 receives a first clock and a second clock as inputs. A clock having a Gen1 frequency may be generated by phase locked loop 365. The clock having a Gen1 frequency is provided to the first input of multiplexer 375. The second input to multiplexer 375 is provided by the output of clock divider 370. Consequently, in a specific embodiment, the two inputs to multiplexer 335 are the Gen1 frequency and the wireless extension frequency, the Gen1 frequency generated by a PLL and the wireless extension frequency being based on the Gen1 frequency, i.e. the Gen1 frequency divided by 3.

In another embodiment, the wireless extension state machine 305 initially selects the Gen1 frequency for both the receiver and the transmitter clocks. However, the wireless extension frequency or other frequency may be selected as the default for the receive and transmitter, as well as selecting the receiver and transmitter clocks individually. Receive physical layer 320 receives a clock having a Gen1 frequency. Receive physical layer 320 also receives data from receive circuit interface 310. The data is passed to link training and status state machine 340 at the selected frequency rate.

Similarly, transmit physical layer 360 receives a clock having a Gen1 frequency. Data is transmitted from the link layer to the physical layer, which may include status state machine 340. Moreover, data is transmitted to the endpoint device at the Gen1 frequency. As an example, data transmitted to the endpoint device is generated by the link layer. Transmit circuit interface 350 may comprise an I/O buffer to transmit the data to the endpoint device.

After receiving data from the endpoint device, receive physical layer 320 and link training and status state machine 340 attempt to train the endpoint device at the Gen1 frequency. Training is initiated by link training and status state machine 340. If the receive physical layer 320 and link training and status state machine 340 are successful in training the endpoint device at the Gen1 frequency, the link training and status state machine 340 provides a signal to the wireless extension state machine 305 to let the wireless extension state machine 305 know that the endpoint device is PCI Express compliant. As a result, wireless extension state machine 305 will continue to select clocks having Gen1 frequencies for multiplexers 335 and 375.

However, if receive physical layer 320 and link training and status state machine 340 fail to train the endpoint device at the Gen1 rate, wireless extension state machine 305 may select the wireless extension clock input for multiplexer 335. Receive physical layer 320 and link training and status state machine 340 may then attempt to K-align the data. For example, receive physical layer 320 may determine symbol boundaries within the bit pattern by looking for a COM symbol. The COM symbol may be a unique K-code character within a bit-sequence. If receive physical layer 320 and link training and status state machine 340 successfully K-align the data, the link training and status state machine 340 may select the wireless extension clock for multiplexer 375 and attempt to train the endpoint device at the wireless extension rate.

In the foregoing specification the invention has been described with reference to specific exemplary embodiments thereof. It will, however, be evident that various modification and changes may be made thereto without departure from the broader spirit and scope of the invention as set forth in the appended claims. The specification and drawings are, accordingly, to be regarded in an illustrative rather than restrictive sense.

What is claimed is:

1. A computer system, comprising:
a microprocessor;
a controller coupled to the microprocessor; the controller being adapted to be wirelessly coupled to a wireless device that is adapted to transmit data at a wireless frequency; the controller having a root port including a transmitter to transmit to the wireless device and a receiver to receive from the wireless device, the receiver adapted to attempt to train the wireless device at a default frequency and in response to the receiver failing to train the wireless device at the default frequency after N attempts where N is an integer greater than or equal to 1, the root port is adapted to steer the receiver to attempt to train the wireless device at the wireless frequency, wherein the transmitter is adapted to transmit information at the default frequency during the receiver attempting to train the wireless device at the wireless frequency, and wherein the root port is adapted to steer the transmitter to transmit information at the wireless frequency in response to the receiver successfully training the wireless device at the wireless frequency.

2. The computer system of claim 1, wherein the controller further comprises:
a phased locked loop to generate a first clock signal at the default frequency;
a clock divider to divide the first clock signal by an integer to generate a second clock signal at the wireless frequency;
wireless extension logic to provide a first signal in response to failing to train the device at the default frequency a first number of times; and
multiplexer logic to select between the first clock signal at the default frequency and the second clock signal at the wireless clock frequency independently for the receiver and the transmitter, wherein the first clock signal is selected by default and the second clock signal is selected in response to the first signal being provided by the wireless extension state machine.

3. The computer system of claim 1, wherein the wireless frequency is ⅓ of the default frequency.

4. The computer system of claim 1, wherein in response to the device being successfully trained by the receiver at the wireless frequency, the transmitter is steered to operate at the wireless frequency.

5. A method, comprising:
transmitting data from a transmitter in a port at a first frequency to an external device;
clocking a receiver in the port at the first frequency;
sampling an incoming signal received by the receiver from the external device at the first frequency;
determining if the first frequency is the correct frequency for sampling the incoming signal;
clocking the receiver at a second frequency to sample the incoming signal received by the receiver at the second frequency in response to determining the first frequency is not the correct frequency for sampling the incoming signal; and determining if the second frequency is the correct frequency for sampling the incoming signal;
transmitting an output signal with the transmitter at the first frequency during determining if the second frequency is the correct frequency for sampling the incoming signal; and
transmitting the output signal with the transmitter at the second frequency in response to determining the second frequency is the correct frequency for sampling the incoming signal.

6. The method of claim 5, wherein determining if the first frequency is the correct frequency for sampling the incoming signal comprises determining if the sampling at the first frequency is locking onto specific bits and identifying symbol boundaries in the incoming signal.

7. The method of claim 6, wherein identifying symbol boundaries within the incoming signal comprises identifying a unique symbol within the incoming signal.

8. The method of claim 5, wherein determining if the first frequency is the correct frequency for sampling the incoming signal further comprises determining a predetermined number of times if the sampling at the first frequency is locking onto specific bits and identifying symbol boundaries in the incoming signal, wherein the predetermined number of times is greater than one.

9. The method of claim 8, further comprising:
clocking the transmitter at the second frequency in response to determining the second frequency is the correct frequency for sampling the incoming signal.

10. The method of claim 9, further comprising: executing a training sequence at the second frequency after clocking the transmitter at the second frequency.

11. The method of claim 5, wherein the first frequency is an integer multiple of the second frequency.

12. An apparatus comprising:
a device including,
receiver logic, while operating at a first frequency, to attempt a predetermined number of times to determine boundaries of data to be received from an endpoint device, the predetermined number of times being greater than one, wherein the receiver logic is to attempt to determine boundaries of data to be received from the endpoint device at a second frequency in response to not determining boundaries of data to be received from the endpoint device the predetermined number of times while operating at the first frequency; and transmitter logic to transmit data to the endpoint device at the first frequency during the receiver logic to attempt to determine boundaries of data to be received from the endpoint device at the second frequency, wherein the transmitter logic is to transmit data to the endpoint device at the second frequency in response to the receiver logic determining boundaries of data received from the endpoint device, while the receiver logic is operating at the second frequency.

13. The apparatus of claim 12, wherein receiver logic, while operating at a first frequency, to attempt a predetermined number of times to determine boundaries of data received from an endpoint device comprises the receiver logic attempting to properly lock onto specific bits within data received from the endpoint device to identify boundaries of a training symbol.

14. The apparatus of claim 13, further comprising link training logic to determine if the receiver logic properly locks onto specific bits within data received from the endpoint device to identify boundaries of a training symbol.

15. The apparatus of claim 12, further comprises clocking logic to provide a first clock at the first frequency and a second clock at the second frequency; and selection logic to provide the second clock to the receiver logic in response to the receiver logic not determine boundaries of data received from the endpoint device the predetermined number of times while operating at the first frequency and to provide the second clock to the transmitter logic in response to the receiver logic determine boundaries of data received from the endpoint device, while the receiver logic is operating at the second frequency.

16. An apparatus comprising:

receiver logic in a port to attempt to identify pattern boundaries of an incoming signal to be received from an external device at a first frequency a predetermined number of times; and clocking logic coupled to the receiver logic and to transmitter logic, the clocking logic to maintain the first frequency to the transmitter logic and to provide a second frequency to the receiver logic in response to the receiver logic not identifying pattern boundaries at the first frequency the predetermined number of times, wherein the clocking logic is further to provide the second frequency to the transmitter logic in response to the receiver logic identifying pattern boundaries at the second frequency within the predetermined number of times;

the transmitter logic to transmit data to the external device at the first frequency during the clocking logic providing the second frequency to the receiver logic in response to the clocking logic maintaining the first frequency to the transmitter logic and to transmit data to the external device at the second frequency in response to the clocking logic provide the section frequency to the transmitter logic.

17. The apparatus of claim 16, wherein the receiver logic is to attempt to identify pattern boundaries at the second frequency a second number of times in response to the clocking logic providing the second frequency to the receiver logic, and wherein the clocking logic is to provide the second frequency to the transmitter logic in response to the receiver logic successfully identifying pattern boundaries at the second frequency.

18. The apparatus of claim 17, the transmitter and receiver logic is associated with physical layer logic of layered stack protocol logic, the layered stack protocol logic including the physical layer logic, link layer logic, and transaction layer logic.

* * * * *